United States Patent [19]

Lierop

[11] Patent Number: 5,575,613

[45] Date of Patent: Nov. 19, 1996

[54] PALLET DISPENSER

[75] Inventor: John V. Lierop, Niagara Park, Australia

[73] Assignee: McNeall Engineering Pty. Ltd., Ermington, Australia

[21] Appl. No.: 495,264

[22] Filed: Jun. 27, 1995

Related U.S. Application Data

[63] Continuation of Ser. No. 152,499, Nov. 16, 1993, abandoned.

[30] Foreign Application Priority Data

Nov. 16, 1992 [AU] Australia .................................. PL5891

[51] Int. Cl.⁶ .................................................. B65G 59/06
[52] U.S. Cl. ........................................ 414/797.4; 414/933
[58] Field of Search ...................... 221/6, 14; 414/798.1, 414/797.4, 933

[56] References Cited

U.S. PATENT DOCUMENTS

| | | | |
|---|---|---|---|
| 3,270,916 | 9/1966 | Lyman | 221/6 |
| 3,623,618 | 11/1971 | Shaw | 414/798.1 X |
| 3,831,806 | 8/1974 | Lindsey | 221/14 X |
| 4,047,622 | 9/1977 | Blessing . | |
| 4,131,213 | 12/1978 | Tamura et al. | 221/14 |
| 4,172,686 | 10/1979 | Shorthouse . | |
| 4,557,656 | 12/1985 | Ouellette . | |

FOREIGN PATENT DOCUMENTS

| | | | |
|---|---|---|---|
| 40895/78 | 4/1980 | Australia . | |
| 2-228794 | 9/1990 | Japan | 221/14 |

Primary Examiner—Andres Kashnikow
Assistant Examiner—Lisa Douglas
Attorney, Agent, or Firm—Pollock, Vande Sande & Priddy

[57] ABSTRACT

A sensing arrangement is disclosed for use in a pallet dispenser or the like, to determine whether a pallet is present or not. A body, having a shaped engagement surface, displaces in the plane of the pallets upon sliding engagement by a pallet, and suitably has side faces angled in both the horizontal and vertical planes, and a front face.

15 Claims, 7 Drawing Sheets

PALLET DISPENSER

This application is a continuation of U.S. patent application Ser. No. 08/152,499, filed Nov. 16, 1993 now abandoned.

TECHNICAL FIELD

The present application relates to pallet dispensers, in particular, pallet dispensers which include means for sensing the presence or absence of a pallet, and to the construction of such sensors,

BACKGROUND ART

Pallet dispensers are used in warehouses and the like to dispense empty reusable pallets for use as required. One class of dispensers uses sensor means to determine whether a pallet is present or not, and if no pallet is in the dispensed position, to dispense a pallet. An example of this type of apparatus is disclosed in the co-pending commonly assigned U.S. application Ser. No. 842,328 now abandoned. This disclosure uses whisker switches to sense a pallet. However, whisker switches are subjected to considerable force in a typical pallet dispenser environment, and are prone to damage, particularly when a pallet is moved so as to reverse the direction of travel and so force the whisker directly into the pallet.

Conventionally, a light and photoelectric sensor arrangement is used, such that anything blocking a clear sight causes the dispenser to refrain from dispensing a further pallet. This type of arrangement is known from, for example, U.S. Pat. No. 4,557,656 to Ouetlette, and Australian application Ser. No. 40895/78 to U.E.B. Industries Ltd. The blockage is intended to be a pallet, however in an industrial situation, tape, cardboard, or other rubbish may obscure clear sight and prevent a further pallet being dispensed.

U.S. Pat. Nos. 4,047,622 to Blessing. 3,623,618 to Shaw, and 4,172,686 to Shorthouse disclose mechanical arrangements which sense the height of pallets, or the associated mechanism, rather than the presence or absence of a pallet at the dispensed position or positions.

It is accordingly an object of the present invention to provide an improved pallet sensing arrangement.

SUMMARY OF INVENTION

The present invention may comprise according to one aspect a sensor for determining the presence or absence of a pallet, comprising a body mounted so as to displace in the plane of a substantially horizontal pallet so as to allow said pallet to travel past said body, said body being biased such that when no pallet is present it assumes a first position, and when engaged by a pallet it assumes a second position, said body engaging s switch means so as to provide a signal indicating the presence or absence of a pallet, wherein said body has a shaped engagement surface adapted to be slidably engaged by pallets from a plurality of directions, said body displacing in response to such engagement.

Preferably said engagement surface include at least one side surface which presents an acute angle to a direction of engagement by pallets.

Preferably said side surface or surfaces taper upwardly,

Preferably there are at least two side surfaces.

Preferably said engagement surface includes a front surface having at least a portion tapering upwardly.

According to another aspect, the present invention comprises an automatic pallet dispenser having at least one dispensing station, wherein dispensed pellets are removed along one axis of the dispenser, and at least one sensor for determining the presence or absence of a pallet is disposed along a side of the dispenser, characterized in that said sensor comprises s body mounted so as to displaces away from said axis, said body being biased such that when no pallet is present it assumes a first position, and when engaged by a pallet it assumes one or more second positions, said body engaging a switch means so as to provide a signal indicating the presence or absence of a pallet, wherein said body has a shaped engagement surface adapted to be slidably engaged by movement of pallets along at least the axis of the dispenser so as to displace said body and allow movement of pallets along said axis.

Preferably there are two dispensing stations, and at least two sensors.

Preferably the dispenser has two dispensing stations, arranged as a front and rear station in line so as to allow access for removal from a single direction, said sensors being mounted one adjacent the front of the rear dispensing station, and the other adjacent the front of the front dispensing station.

According to another aspect the present invention comprises a pallet handling device including at least one sensor according to the present invention.

The present invention provides a simple, reliable sensor arrangement suitable for use in both single and multiple pallet applications. A particular advantage of the preferred embodiment is the ability to reliably sense pallets which engage the sensor from either side, as well as from the front.

BRIEF DESCRIPTION OF DRAWINGS

An illustrative embodiment will now be described with reference to the drawings, in which.

DESCRIPTION OF EMBODIMENT

Figure 1:
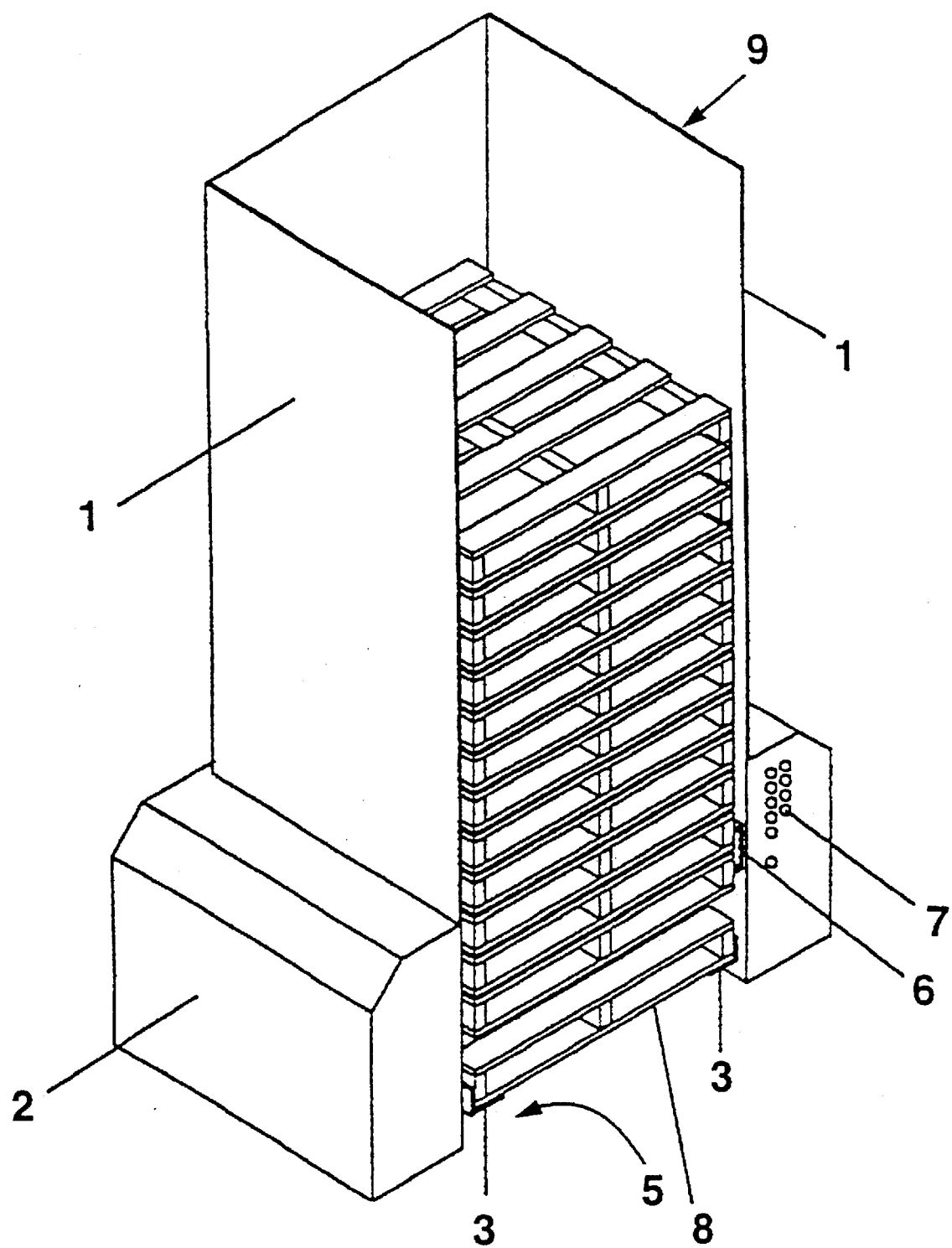
FIG. 1 shows schematically a single pallet dispenser.

Referring to FIG. 1, a schematic illustration of a pallet dispenser is shown. A hopper 1 contains a number of pallets, typically 10 to 30. Clamp arm 6 and lift arms 3 allow for movement of pallets one by one as required along a vertical first axis to the dispensing station. The horizontal plane above the dispensing station 5 constitutes an entry opening to the dispensing station 5. A pallet in the dispensing station 5 is removed by motion along a horizontal second axis, through the front of the dispenser. The front of the dispenser and dispensing station 5 constitutes an exit opening. The lift arrangements per se do not form part of the present invention, and will be understood and well known to those skilled in the art. An illustrative system is disclosed, for example, in co-pending U.S. application Ser. No 842,328 now abandoned.

The present invention is particularly concerned with the determination of whether a pallet 8 is waiting to be collected from the dispensing station 5, or whether another pallet needs to be dispensed as the pallet 8 has been taken. The following discussion is directed principally at a single pallet machine, however, it Will be apparent to the reader that the same principles may be readily adapted to multi-pallet systems.

Referring to FIG. 1, an illustrative automatic pallet dispenser 9 comprises a hopper 1 containing a stack of pallets for dispensing as required. Lift arms 3 raise and lower the stack of pallets along a vertical first axis as required, and dispensing of pallets is effected by cooperation between cramp 6 and lift arms 3. The lift mechanism and control system may be housed in housings 2, 7.

Figure 2:
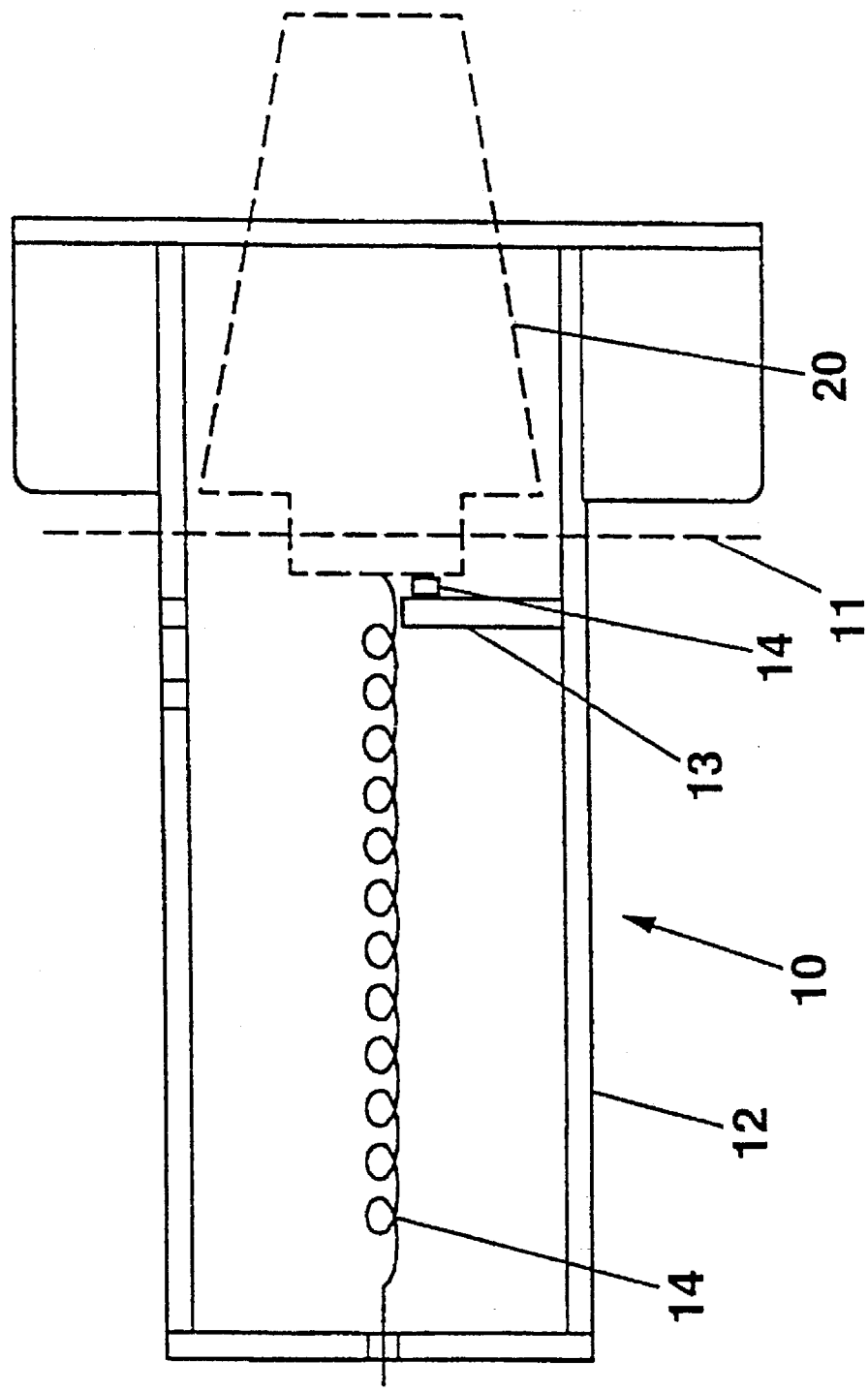
FIG. 2 shows a view looking down on the sensing means.

Referring to FIG. 2, each sensor 10 comprises a housing 12, and a pivotally mounted lever body 20. The lever body 20 a horizontal trial axis 11 shown in dotted outline. In an open, i.e. no pallet, position, switch 14 is open and the dispenser is arranged to cycle end dispense a new pallet. Switch 14 is mounted to step 13 and operated by lever body 20. Bias means 15, attached to the upper end of the lever body 20, ensure that the lever remains forced outward unless a considerable force is placed on it. Bias means 15 may suitably be a coil spring, however, any other suitable arrangement may be used.

It will be appreciated that the exact mechanical arrangement may be varied while providing the functionality required by the present invention.

The shape of the lever must be carefully selected, so as to reliably engage while wearing well and being robust in use.

Figure 3:
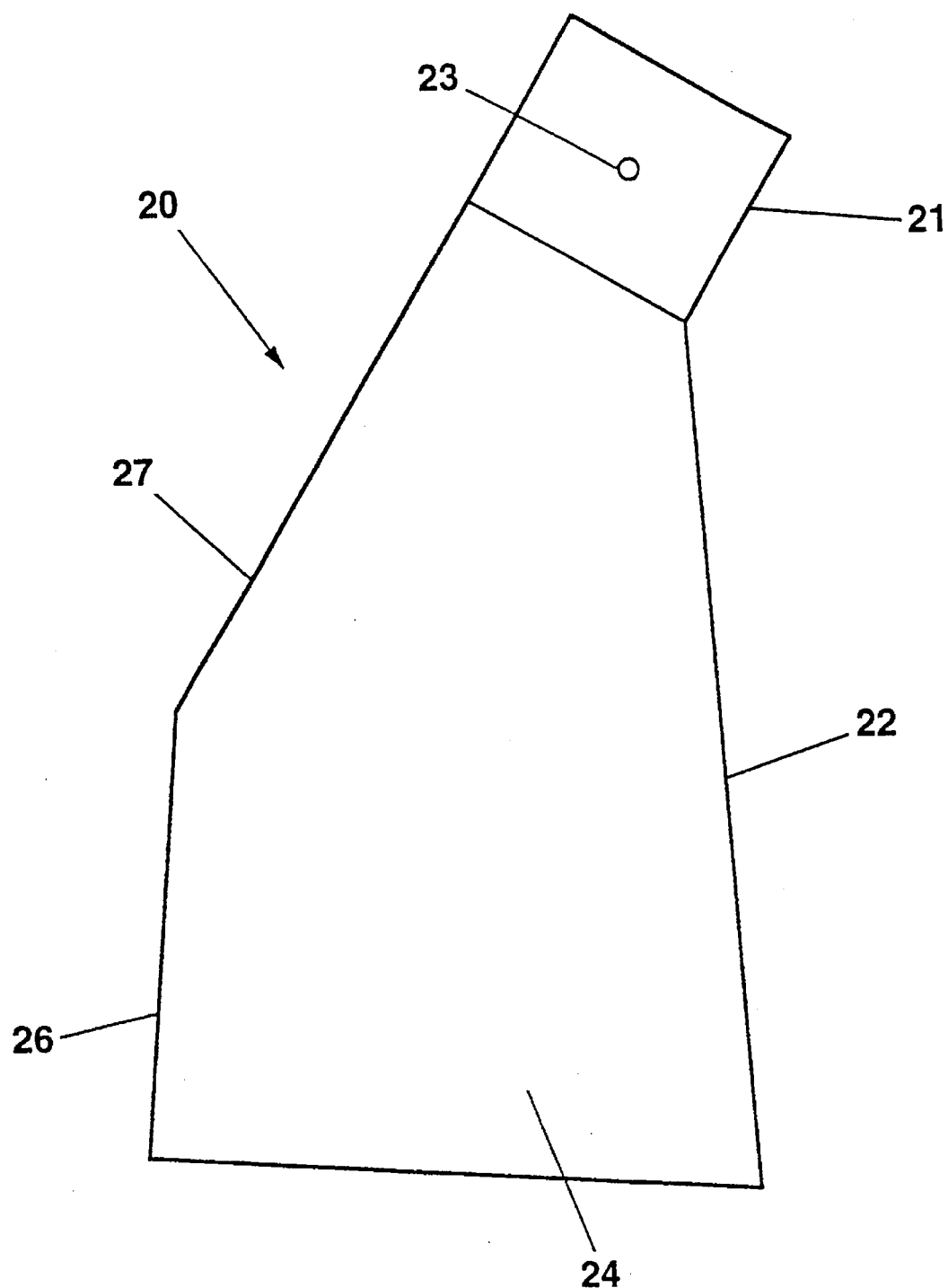
FIGS. 3, 4 and 5 shows respectively side elevation, front and rear views of the illustrative lever device.

A preferred Implementation of the lever body 20 will be described with reference to FIGS. 3 to 5. Referring to FIG. 3, the top potion 21 is adapted for connection to a suitable pivot arrangement, via opening 23. It will be understood that any conventional bearing arrangement, for example a pin or bolt, may be used to allow for pivoting. Rear end 22 is substantially flat, and front/tap faces 26,27 are at two distinct angles. The lever body 20 in use will pivot in the direction of face 22, when operatively engaged by a pallet either on front end tap faces 26,27 or either of side faces 24 or 25. Faces 24, 25, 26 and 27 together constitute an engagement surface.

The lever is preferably constructed from cast Nylon such that each face 24, 25 (FIG. 4) is 25° from the normal to the rear of the lever. It has been determined for Nylon that the critical angle is about 30°, but the extra margin Is included for safety and reliability. It will be appreciated that for other materials, a different angle will be appropriate—e.g. for a higher relative coefficient of friction material such as steel, a larger angle is necessary. The invention may be implemented with any suitable material, with appropriate modification to the angles of the faces. It is critical for satisfactory operation that the engagement between the lever body, and the pellet, be sliding in nature so that the body is displaced out of the line of pallet movement while the pellet is moved past.

Figure 4:
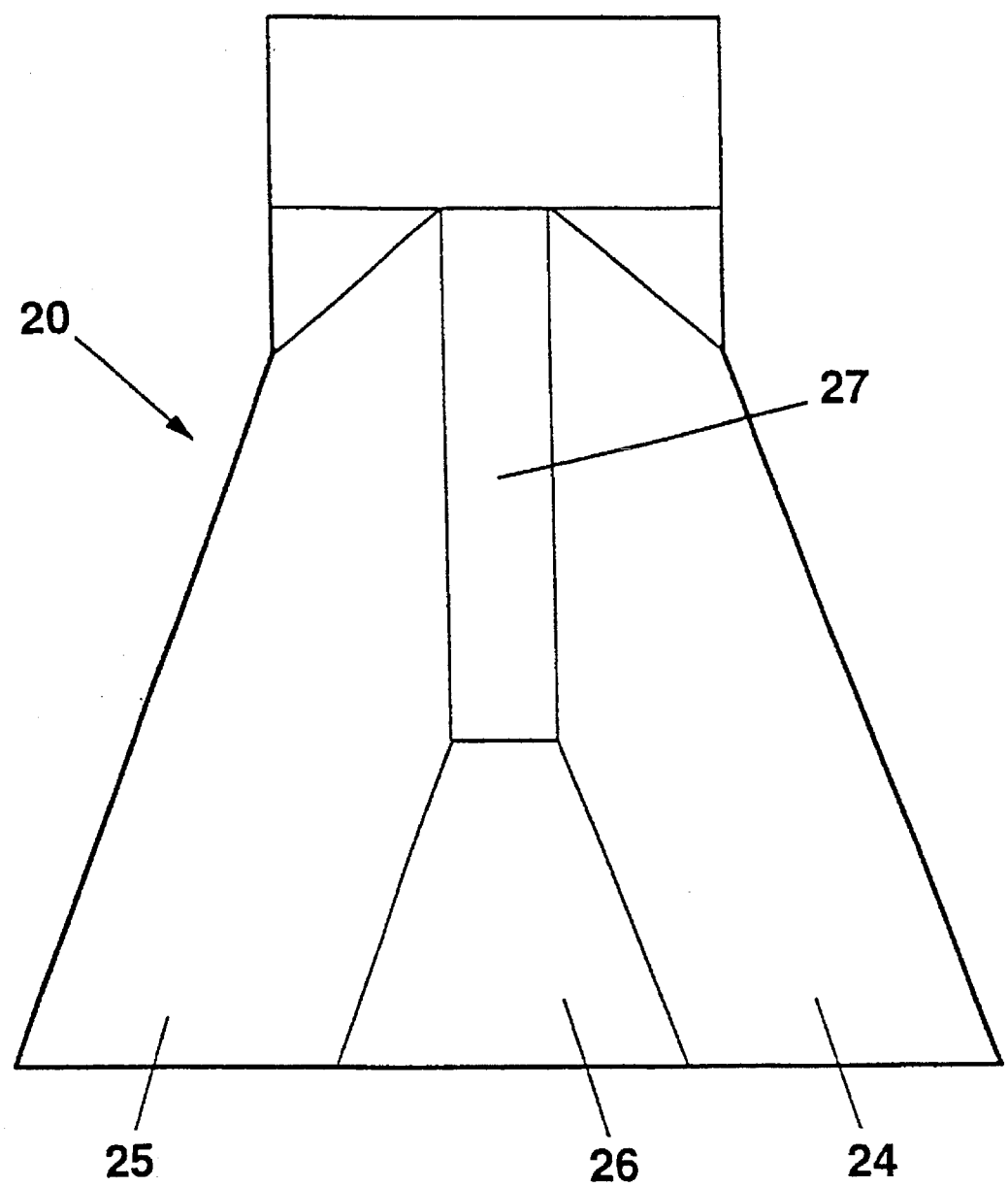
Figure 5:
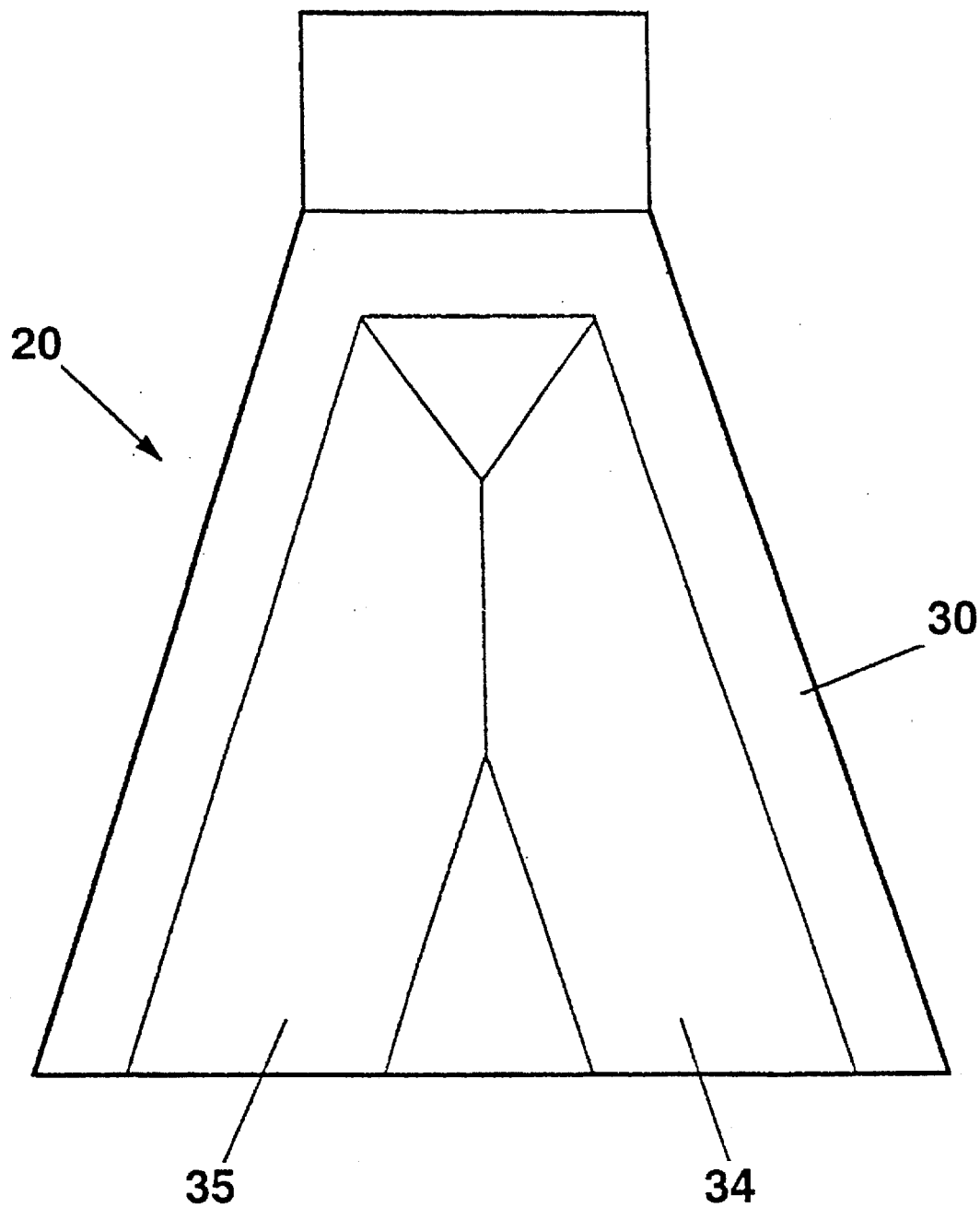

Considering FIG. 4, sloping side faces 24, 25 are the main engaging surfaces. Front face 26 is cut away, and the tap surface 27 is flat and at an angle to front surface 26. Preferably, front preface 26 is substantially vertical, and tap face 27 is at an angle of about 30° from vertical. From the rear, in FIG. 5, the thickness of the walls 30 can be seen. This is illustratively 1 to 2 cm. Surfaces 35, 34 slope inwardly.

Switch 14 may be electric, but is preferably pneumatic in a pneumatic system, and hence allows the entire system to operate pneumatically. The invention is most advantageous when used in a double dispenser arrangement. It is applicable to any type of dispenser, including hydraulic arrangements.

It is noted that one embodiment of the present invention uses only one sloping side face 24 or 25. The face which is angled on the front side of the lever body may be omitted; however, this is not preferred. Alternatively, multiple angled or curved faces could be provided. The present invention could be Implemented using a smoothly curved surface to provide the necessary engagement surface. Similarly, the lever body may perform a linear rather than pivoting motion, or other mode of movement, if desired.

Figure 6:
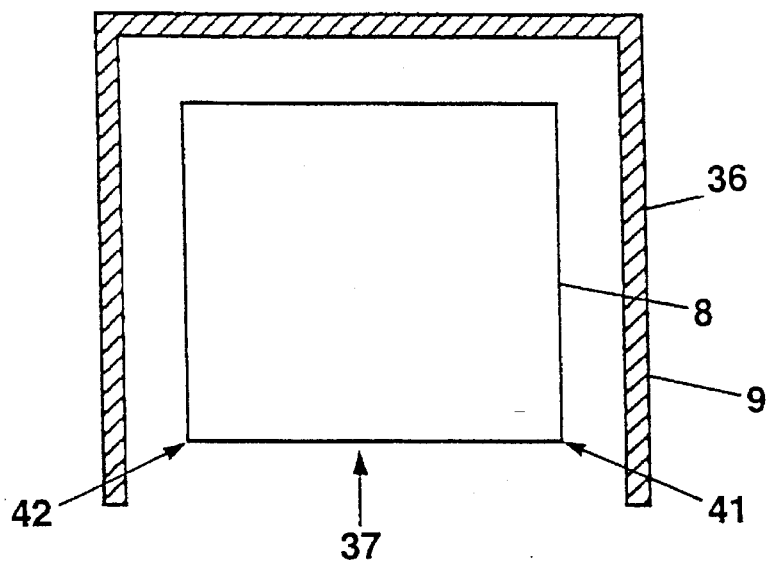
FIG. 6 shows schematically the placement of the inventive sensing means in a single pallet dispenser.
Figure 8:
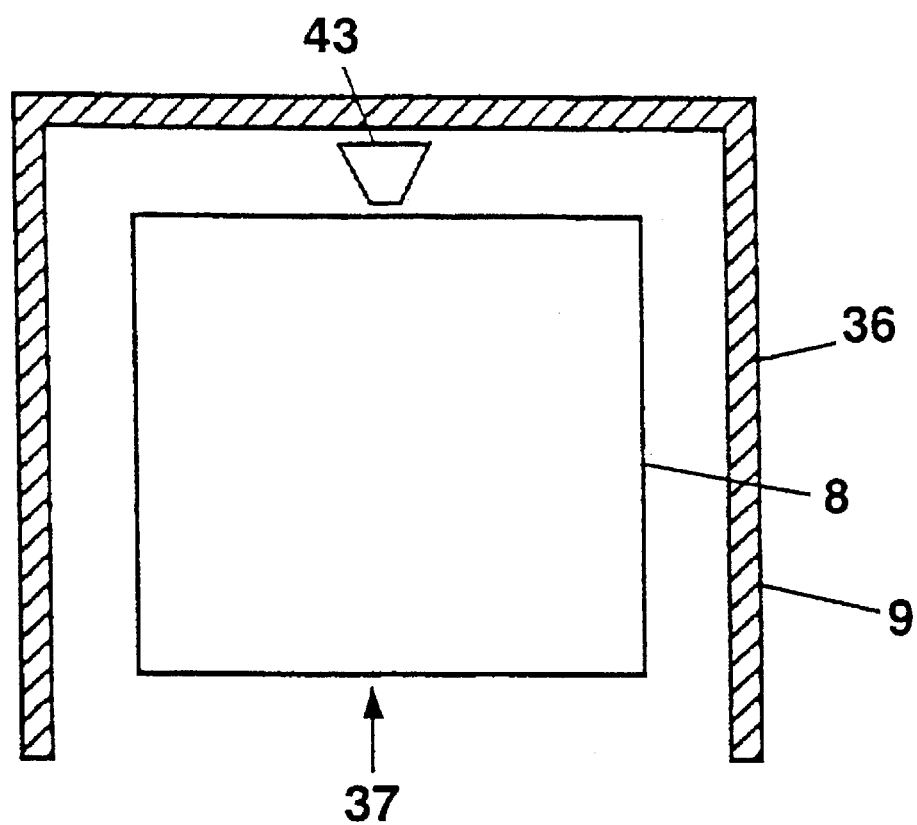
FIG. 8 shows schematically an alternative placement of the inventive sensing means in a single pallet dispenser.

FIGS. 6 and 8 illustrate schematically the placement of the sensor 10 within a single bay pallet dispenser 36. For the purpose of illustration, only the pallets in the bosom row, or dispensing station, are shown. Pallet 8 is within housing 9, and access for removal of pallets is along second axis 37. The sensor 10 is preferably placed at the one of the front positions 41, 42 of the housing as shown in FIG 6. However, sensor 10 may alternatively be placed near the rear of the bay, at position 43 as in FIG. 8. The latter is preferred in a pallet collating application.

Figure 7:
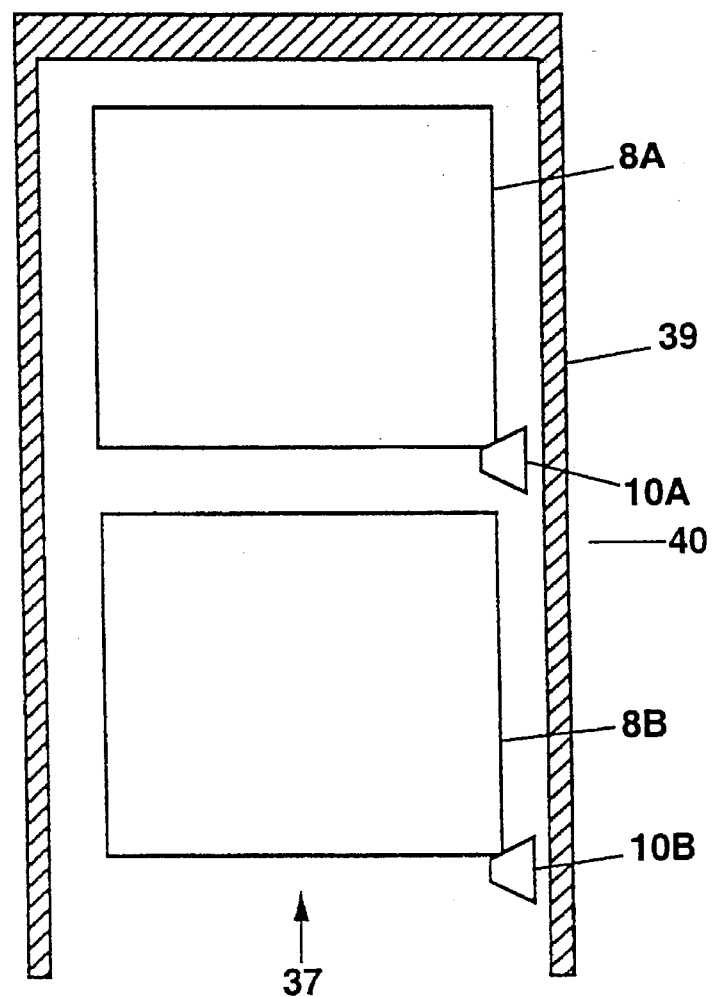
FIG. 7 shows schematically the placement of the inventive sensing means in a double pallet dispenser.

FIG. 7 is a similar schematic view to FIG. 6, showing a double pallet dispenser. Dispenser 40 comprises housing 39, and has two sensors 10A, 10B. The three angled sensor bodies allow for a pallet 8A to be sensed in the rear bay, as well as a pallet 8B in the front bay. The inventive arrangement allows for pallets to be dragged past the sensors 10A, 10B without damage, and to pivot in response to such movements of pallets. It will be understood that the sensors may be placed on the other side, or more or less sensors used, within the general principle of the system.

It will be appreciated that while the disclosure is in terms of a pallet dispenser, the apparatus may be a collator as well, or alternatively a different pallet handling device such as a palletizer or depalletizer.

It will be appreciated that variations and additions are possible within the spirit and scope of the invention.

I claim:

1. An automatic pallet dispenser having a dispensing station which dispenses pallets from the dispenser;

said station having an entry opening and an exit opening so arranged that pallets enter the station via the entry opening and leave via the exit opening, pallets passing through the entry opening travelling along a first axis and pallets passing through the exit opening travelling along a second axis, said second axis being substantially perpendicular to said first axis;

a sensor for determining the presence or absence of a pallet in said station, said sensor including a body mounted adjacent a side wall of the dispensing station and extending into the station, said body being movable between a first position, when a pallet is absent from the station, and a second position, when a pallet is present in said station; and biasing means operative to bias said body to said first position;

said body having a shaped engagement surface for slidably engaging a side of a pallet as it passes into said station along said first axis and out of the station along the second axis and for causing said body to move between said first and second positions as the pallet slides past said body into or out of the dispensing station.

2. The dispenser of claim 1 wherein said engagement surface includes a top face which, when said body is in said first position, extends in a plane angled to said first axis, for slidably contacting a pallet moving along said first axis.

3. The dispenser of claim 2 wherein said top face extends in a plane parallel to said second axis.

4. The dispenser of claim 3 wherein said engagement surface includes first and second side faces extending in planes angled to said second axis on either side of said top face and diverging from one another in the direction of said first axis.

5. The dispenser of claim 1 wherein said engagement surface includes first and second side faces which, when said body is in said first position, respectively extend in planes angled to said second axis, for contacting a pallet moving along said second axis.

6. The dispenser of claim 1 wherein said engagement surface includes a front face which, when said body is in said first position, extends in a plane substantially parallel to a plane defined by said first and second axes.

7. The dispenser of claim 1 wherein said body is pivoted about a third axis.

8. The dispenser of claim 7 wherein said third axis is parallel to said second axis.

9. The dispenser of claim 1 further including a pallet hopper, and means for moving a pallet between said hopper and said dispensing station via said entry opening.

10. An automatic pallet dispenser having:

a dispensing station which dispenses an individual pallet, said dispensing station having an entry opening and an exit opening so arranged that pallets may enter said station via said entry opening and leave via said exit opening, pallets passing through said entry opening travelling along a first axis, and pallets passing through said exit opening travelling along a second axis perpendicular to said first axis;

a sensor mounted adjacent a side wall of the dispensing station for determining the presence or absence of a pallet in the station, said sensor including a body extending into said station and pivotably mounted about a third axis parallel to said second axis, said body being pivotably movable about said third axis between a first position when a pallet is absent from said station and a second position when a pallet is present in said station; and biasing means for biasing said body to said first position;

said body having an engagement surface for slidably engaging the side of a pallet as it enters and leaves said station via said entry and exit openings respectively;

said engagement surface comprising a top surface, first and second side surfaces and a front surface so arranged relative to one another that, when said body is in said first position, said top surface faces said entry opening and extends in a plane parallel to said second axis and at an angle to said first axis, said side surfaces extend on either side of said top surface away from said entry opening in planes angled to both said first and second axes with said first side surface facing said exit opening, and said front surface extends between said top and side surfaces in a plane substantially parallel to said first and second axes.

11. An automatic pallet dispenser having:

a dispensing station which dispenses an individual pallet, said dispensing station having an entry opening and an exit opening so arranged that pallets may enter said station via said entry opening and leave via said exit opening, pallets passing through said entry opening travelling along a first axis, and pallets passing through said exit opening travelling along a second axis perpendicular to said first axis;

a sensor mounted adjacent a side wall of the dispensing station for determining the presence or absence of a pallet in the station, said sensor including a body extending into said station, said body being movable between a first position when a pallet is absent from said station and a second position when a pallet is present in said station; and biasing means for biasing said body to said first position;

said body having an engagement surface for slidably engaging a side of a pallet as it enters and leaves said station via said entry and exit openings respectively;

said engagement surface comprising a top surface, a first side surface and a front surface so arranged relative to one another that, when said body is in said first position, said top surface faces said entry opening at an angle to said first axis and said first side surface is angled to said second axis with said first side surface facing away from said exit opening, said front surface engaging the side of a pallet.

12. The automatic pallet dispenser of claim 11 wherein said engagement surface comprises a second side surface angled to said second axis and facing toward said exit opening.

13. The automatic pallet dispenser of claim 11 wherein said body is pivotably mounted about a third axis substantially parallel to said second axis for movement between the first and second axes.

14. An automatic pallet dispenser having:

a dispensing station which dispenses an individual pallet, said dispensing station having an entry opening and an exit opening so arranged that pallets may enter said station via said entry opening and leave via said exit opening, pallets passing through said entry opening travelling along a first axis, and pallets passing through said exit opening travelling along a second axis perpendicular to said first axis;

a sensor mounted adjacent a side wall of the dispensing station for determining the presence or absence of a pallet in the station, said sensor including a body extending into said station, said body being movable between a first position when a pallet is absent from said station and a second position when a pallet is present in said station; and biasing means for biasing said body to said first position;

said body having an engagement surface for slidably engaging a side of a pallet as it enters and leaves said station via said entry and exit openings respectively;

said engagement surface comprising a top surface, a first side surface and a front surface so arranged relative to one another that, when said body is in said first position, said top surface faces said entry opening at an angle to said first axis and said first side surface is angled to said second axis with said first side surface facing said exit opening, said front surface engaging the side of a pallet.

15. The automatic pallet dispenser of claim 14 wherein said body is pivotably mounted about a third axis substantially parallel to said second axis for movement between the first and second axes.

* * * * *